US012673425B2

(12) United States Patent
Briscoe et al.

(10) Patent No.:     US 12,673,425 B2
(45) Date of Patent:     **\*Jul. 7, 2026**

(54) METHOD AND SYSTEM FOR ASSEMBLING A ROTOR STACK FOR AN ELECTRIC MOTOR

(71) Applicants: Ford Global Technologies, LLC, Dearborn, MI (US); ABB Inc., Auburn Hills, MI (US)

(72) Inventors: Mark E. Briscoe, Milford, MI (US); Nick Sochacki, Ann Arbor, MI (US); Al Marrocco, Windsor (CA); Arnold Bell, Brighton, MI (US); James Jozwiak, Grand Blanc, MI (US)

(73) Assignees: Ford Global Technologies, LLC, Dearborn, MI (US); ABB Inc., Auburn Hills, MI (US)

( \* ) Notice: Subject to any disclaimer, the term of this patent is extended or adjusted under 35 U.S.C. 154(b) by 63 days.

This patent is subject to a terminal disclaimer.

(21) Appl. No.: 18/494,123

(22) Filed: Oct. 25, 2023

(65) Prior Publication Data

US 2024/0051142 A1     Feb. 15, 2024

Related U.S. Application Data

(63) Continuation of application No. 17/161,084, filed on Jan. 28, 2021, now Pat. No. 11,826,915.

(51) Int. Cl.
| | |
|---|---|
| *B25J 9/16* | (2006.01) |
| *B25J 9/00* | (2006.01) |
| *B25J 13/08* | (2006.01) |
| *H02K 15/03* | (2025.01) |

(52) U.S. Cl.
CPC ........... *B25J 9/1687* (2013.01); *B25J 9/0084* (2013.01); *B25J 9/1633* (2013.01); *B25J 13/085* (2013.01); *H02K 15/03* (2013.01)

(58) Field of Classification Search
CPC ...... B25J 13/085; B25J 9/0084; B25J 9/1633; B25J 9/1687; H02K 15/03; H02K 2201/06
USPC ........................................... 29/596–598, 732
See application file for complete search history.

(56) References Cited

U.S. PATENT DOCUMENTS

| | | | | |
|---|---|---|---|---|
| 11,557,944 | B2 * | 1/2023 | Briscoe ................. | H02K 1/276 |
| 11,826,915 | B2 * | 11/2023 | Briscoe ................. | H02K 15/03 |
| 2019/0190330 | A1 * | 6/2019 | Shudo ..................... | H02K 1/28 |
| 2024/0051142 | A1 * | 2/2024 | Briscoe ................. | B25J 9/1633 |

FOREIGN PATENT DOCUMENTS

| | | | | | |
|---|---|---|---|---|---|
| CN | 105490473 | A | * | 4/2016 | ............. H02K 15/03 |
| DE | 102020103397 | A1 | * | 8/2021 | ........... H02K 1/2766 |

\* cited by examiner

*Primary Examiner* — Minh N Trinh
(74) *Attorney, Agent, or Firm* — Burris Law, PLLC

(57) ABSTRACT

The present disclosure includes a method of assembling a plurality of rotor cores for an electric converter. The method includes providing a core robotic system employing force control feedback and an insert assembly robotic (IAR) system; placing a rotor core of the plurality of rotor cores on a mandrel by the core robotic system employing force control feedback, wherein each rotor core from the plurality of rotor cores includes a plurality of cavities; and placing a plurality of magnetizable inserts into the plurality of cavities in the rotor core by the insert assembly robotic (IAR) system employing force control feedback.

15 Claims, 4 Drawing Sheets

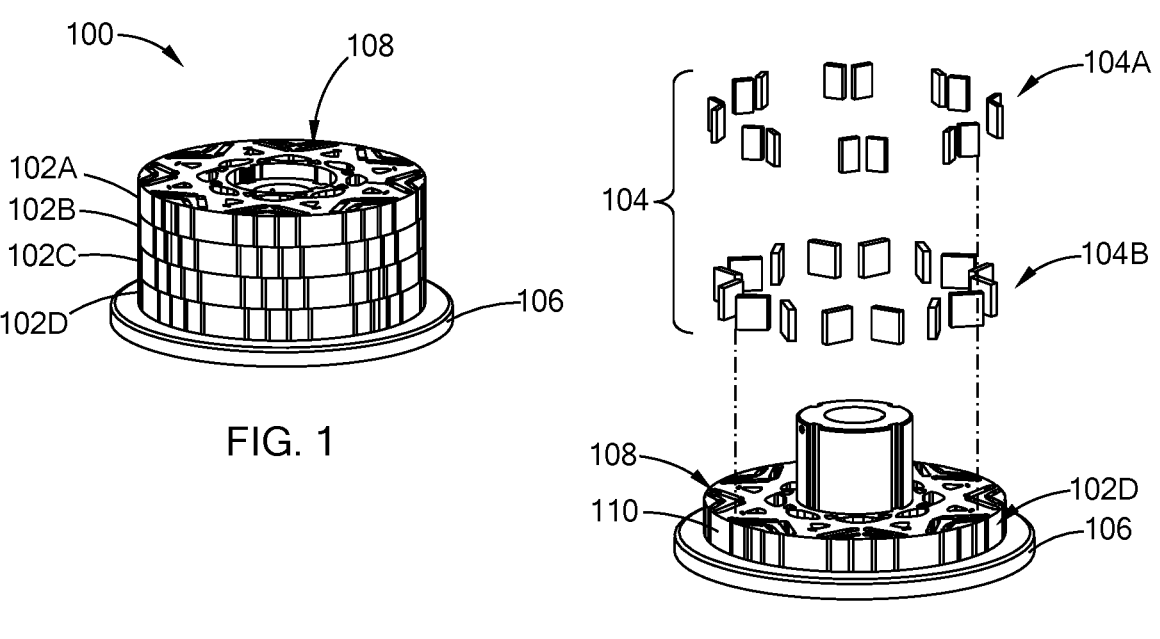
FIG. 1
FIG. 2A
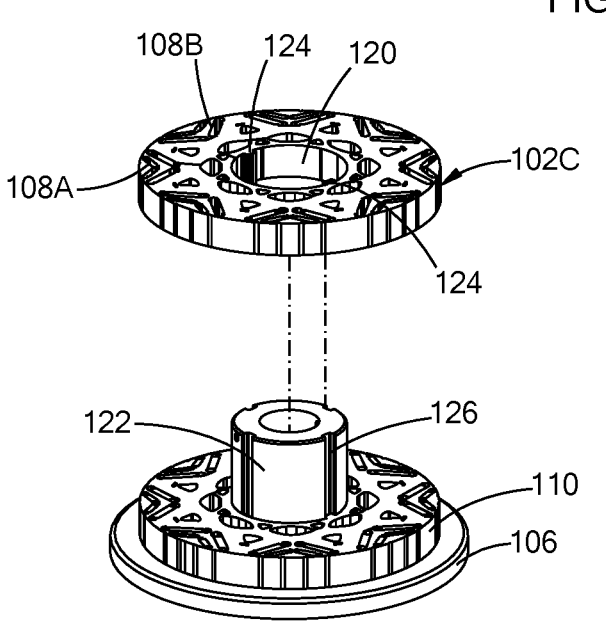
FIG. 2B

METHOD AND SYSTEM FOR ASSEMBLING A ROTOR STACK FOR AN ELECTRIC MOTOR

CROSS-REFERENCE TO RELATED APPLICATIONS

This application is a continuation of U.S. patent application Ser. No. 17/161,084, filed Jan. 28, 2021, titled "METHOD AND SYSTEM FOR ASSEMBLING A ROTOR STACK FOR AN ELECTRIC MOTOR", and related to copending applications titled "ROTOR ASSEMBLY METHOD AND SYSTEM EMPLOYING CENTRAL MULTI-TASKING ROBOTIC SYSTEM," as filed in U.S. patent application Ser. No. 17/161,121 on Jan. 28, 2021, "METHOD AND APPARATUS FOR TRANSFER MOLDING OF ELECTRIC MOTOR CORES AND MAGNETIZABLE INSERTS," as filed in U.S. patent application Ser. No. 17/161,175, on Jan. 28, 2021 and "INTEGRATED ROBOTIC END EFFECTORS HAVING END OF ARM TOOL GRIPPERS," as filed in U.S. patent application Ser. No. 17/160,762, on Jan. 28, 2021, which are commonly assigned with the present application and the contents of which are incorporated herein by reference in their entireties.

FIELD

The present disclosure relates to assembly of a rotor and more particularly to, assembly of a rotor formed of multiple rotor cores.

BACKGROUND

The statements in this section merely provide background information related to the present disclosure and may not constitute prior art.

Recent advancements in electric converters such as electric motors and/or generators relate not only to performance, but also to manufacturing, as the need for electric converters has increased in various industries including automotive. More particularly, in the automotive industry, electric motors can vary across different platforms since powertrain requirements of a small vehicle is different from that of a truck. For example, with respect to the rotor of the electric motor, the overall size of the rotor (e.g., diameter, height, etc.) to the type of magnets installed, can vary platform-to-platform. Such variations can result in complex rigid assembly lines that impede dynamic flexible configurations.

These and other issues related to the assembly of a rotor are addressed by the present disclosure.

SUMMARY

This section provides a general summary of the disclosure and is not a comprehensive disclosure of its full scope or all of its features.

The present disclosure is directed toward a method of assembling a plurality of rotor cores for an electric converter. The method includes providing a core robotic system employing force control feedback and an insert assembly robotic (IAR) system; placing a rotor core of the plurality of rotor cores on a mandrel by the core robotic system employing force control feedback, wherein each rotor core from the plurality of rotor cores includes a plurality of cavities; and placing a plurality of magnetizable inserts into the plurality of cavities in the rotor core by the insert assembly robotic (IAR) system employing force control feedback.

The following provides one or more variations of this method, which may be implemented individually or in any combination:

In some aspects, the techniques described herein relate to a method, wherein placing the magnetizable inserts further includes: gripping, at a first orientation, one or more magnetizable inserts from the plurality of magnetizable inserts by the IAR system; and aligning and positioning, at a second orientation different from the first orientation, the one or more magnetizable inserts at one or more cavities among the plurality of cavities based on a force feedback detected by the IAR system.

In some aspects, the techniques described herein relate to a method, wherein placing the magnetizable inserts further includes releasing, by the IAR system, the one or more magnetizable inserts into the one or more cavities, wherein the one or more magnetizable inserts independently descend into the one or more cavities.

In some aspects, the techniques described herein relate to a method, wherein the plurality of magnetizable inserts includes a first set of magnetizable inserts and a second set of magnetizable inserts, wherein the first set of magnetizable inserts is of a different size than that of the second set of magnetizable inserts.

In some aspects, the techniques described herein relate to a method, wherein placing the rotor core on the mandrel further includes: aligning, by the core robotic system, an alignment feature at an inner diameter of the rotor core with an alignment feature at an outer diameter of the mandrel based on a force feedback detected by the core robotic system; and translationally moving, by the core robotic system, the rotor core along the mandrel based on the force feedback detected by the core robotic system.

In some aspects, the techniques described herein relate to a method, wherein after the plurality of magnetizable inserts are placed in a first rotor core from among the plurality of rotor cores, the method further includes aligning, by the core robotic system, a second rotor core from among the plurality of rotor cores on the mandrel and the first rotor core based on the force feedback.

In some aspects, the techniques described herein relate to a method further including controlling, by a control system, movement of the core robotic system and the IAR system to have the core robotic system acquire the second rotor core prior to the IAR system completing placement of the plurality of magnetizable inserts into the plurality of cavities.

In some aspects, the techniques described herein relate to a method further including: transferring, by the core robotic system, the plurality of rotor cores with the mandrel in response to completion of the assembly; and placing, by the core robotic system, a second mandrel for subsequent assembly of rotor cores.

In some aspects, the techniques described herein relate to a method further including: monitoring force control feedback from the core robotic system, the IAR system or a combination thereof; and determining an abnormal installation operation in response to the monitored force control feedback exceeding a desired parameter.

In some aspects, the techniques described herein relate to a method further including: detecting a force or torque, by the core robotic system, the IAR system, or a combination thereof; and outputting the detected force or torque as an electrical signal.

In some aspects, the techniques described herein relate to a method further including: analyzing the electrical signal, by a controller of the core robotic system, to determine whether the detected force or torque aligns with a defined value or profile; and adjusting, by the controller of the core robotic system, a movement of a robotic arm of the core robotic system until the detected force or torque values coincides with the defined value or profile.

In some aspects, the techniques described herein relate to a method further including: analyzing the electrical signal, by a controller of the IAR system, to determine whether the detected force or torque aligns with a defined value or profile; and adjusting, by the controller of the IAR system, a movement of an insert assembly robot of the IAR system until the detected force or torque values coincides with the defined value or profile.

In some aspects, the techniques described herein relate to a method further including transmitting data from a core robotic system or IAR system to a controller, wherein the data includes at least one of whether a rotor core is positioned on the mandrel, whether the IAR system has placed the plurality of magnetizable inserts into the plurality of cavities, or an occurrence of an abnormal operation.

In one form, the present disclosure is directed toward a system for assembling a plurality of rotor cores for an electric converter. The system includes a core robotic system employing force control feedback, the core robotic system configured to place a rotor core of the plurality of rotor cores on a mandrel, wherein each one rotor core from the plurality of rotor cores includes a plurality of cavities, the core robotic system including: a core controller; robotic arm in communication with the core controller, wherein the core controller is configured to control movement of the robotic arm; a rotor core end effector disposed on the robotic arm; and at least one first load cell integrated in the rotor core end effector, wherein the at least one first load cell is configured to detect a first force or first torque and output, to the core controller, a first electrical signal associated with the detected first force or first torque for force control feedback of the core robotic system. The system further includes an insert assembly robotic (IAR) system employing force control feedback, the IAR system configured to place a plurality of magnetizable inserts into the plurality of cavities in the rotor core, the IAR system including: an IAR controller; at least one insert assembly robot in communication with the IAR controller, wherein the IAR controller is configured to control movement of the at least one insert assembly robot; a gripper end effector disposed on the at least one insert assembly robot; and at least one second load cell disposed on the gripper end effector, the at least one second load cell configured to detect a second force or second torque and output, to the IAR controller, a second electrical signal associated with the detected second force or second torque for force control feedback of the IAR system.

The following provides one or more variations of this method, which may be implemented individually or in any combination:

In some aspects, the techniques described herein relate to a system, further including one or more cartridge feeders, the one or more cartridge feeders configured to hold and dispense the magnetizable inserts.

In some aspects, the techniques described herein relate to a system, wherein the one or more cartridge feeders includes: a cartridge configured to hold multiple magnetizable inserts from the plurality of magnetizable insert; and a pneumatic slide configured to dispense a single magnetizable insert, from the multiple magnetizable inserts, at a time from the cartridge.

In some aspects, the techniques described herein relate to a system, wherein the core controller is configured to automatically adjust the movement of the robotic arm from a programmed path based on the first force or first torque detected by the at least one first load cell.

In some aspects, the techniques described herein relate to a system, wherein the IAR controller is configured to automatically adjust the movement of the insert assembly robot from a programmed path based on the second force or second torque detected by the at least one second load cell.

In some aspects, the techniques described herein relate to a system, further including a central controller in operable communication with the core robotic system and the IAR system, the central controller configured to control the operation of the core robotic system and the IAR system to coordinate movement therebetween.

In some aspects, the techniques described herein relate to a system, wherein the central controller is configured to obtain data regarding the force control feedback performed by the core robotic system and the IAR system, and analyze the data to determine trends associated with the assembly of the plurality of rotor cores.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a perspective view of a rotor in accordance with the present disclosure;

FIGS. 2A and 2B are exploded views of a mandrel having rotor core and magnets in accordance with the present disclosure;

Figure 4A:
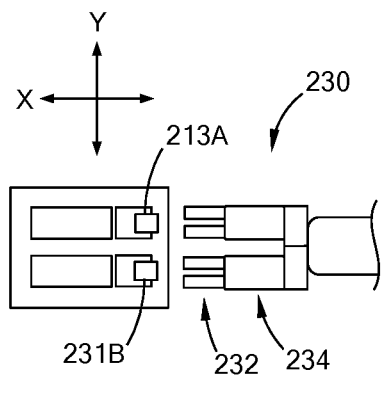
Figures 4B, 4C:
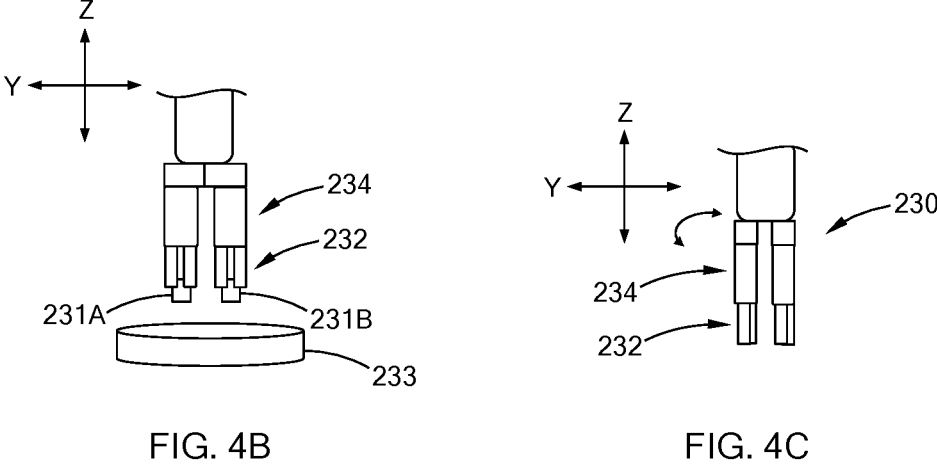
Figure 5:
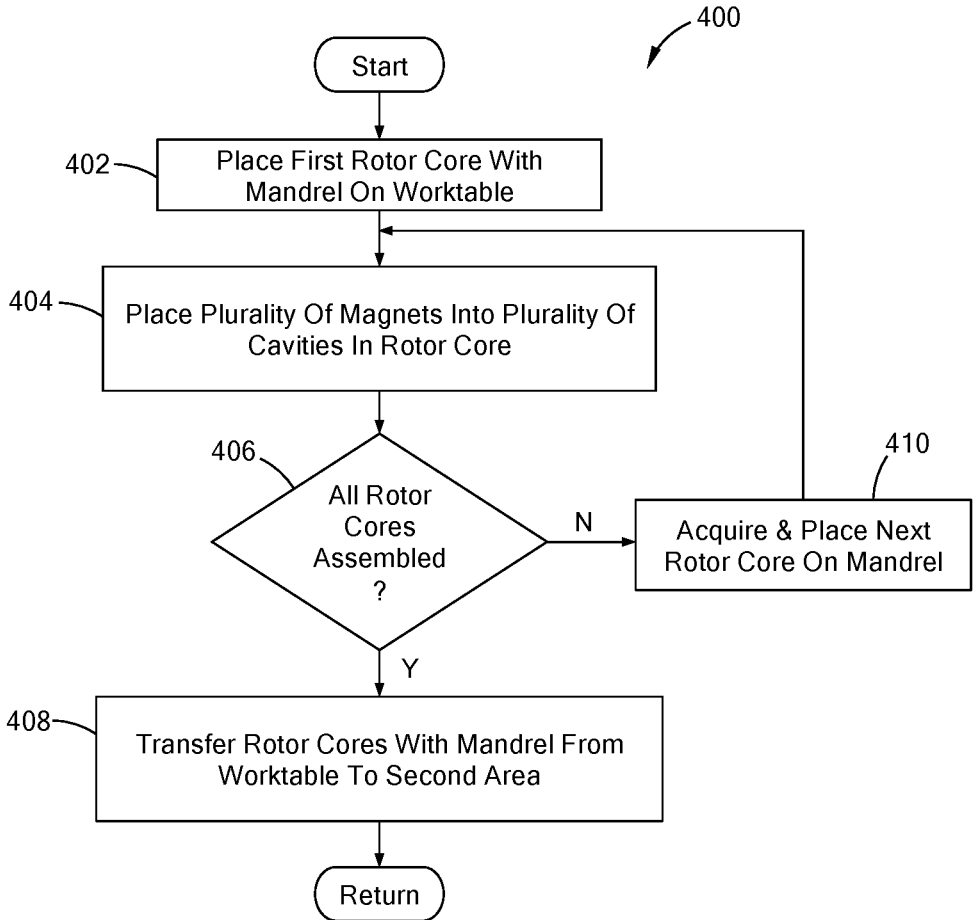

FIGS. 4A, 4B, and 4C illustrate movement of an end-effector tool of an insert assembly robot; and FIG. 5 is a flowchart of an exemplary assembly routine of the rotor cores in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In an exemplary application, a rotor for an electric converter, such as an electric motor or a generator, comprises a plurality of rotor cores fixedly secured to one another and a plurality of magnets disposed within the rotor cores, where the rotor cores and the plurality of magnets are fixedly secured to one another. The present disclosure provides a method of assembling the rotor cores using force control feedback robotic systems that employ force control technology to monitor and adjust automated processes to, for example, position rotor cores on a mandrel and place magnetizable inserts into cavities defined within the rotor cores.

In one form, the tolerance range associated with the size of the cavity and the magnetizable inserts is typically tight (e.g., less than a millimeter) making it difficult to use other monitoring techniques such as a vision system to control operation of a robotic system. The assembly method described herein can be employed for different size rotor cores and/or magnetizable inserts and using the same or substantially the same robotic systems. While the rotor assembly method is described in association with an electric motor, the same method can be employed with other suitable electric converters, such as a generator.

Referring to FIGS. 1, 2A, and 2B, a rotor assembly 100 of an electric motor includes a plurality of rotor cores 102A to 102D (collectively "rotor cores 102") and a plurality of magnetizable inserts 104 that are disposed in the rotor cores 102. The rotor cores 102 are stackingly and coaxially arranged with one another about a mandrel 106. Each rotor core 102 defines a plurality of cavities 108 for receiving the plurality of magnetizable inserts 104. In one application, the plurality of cavities 108 may be of different sizes to accommodate different size magnetizable inserts 104. For example, as illustrated, the plurality of cavities 108 includes a first set of cavities 108A and a second set of cavities 108B, where the first set of cavities 108A are smaller in size than that of the second set of cavities 108B. In one form, the first set of cavities 108A and the second set of cavities 108B are arranged in pairs to form first set pairs and second set pairs that are circumferentially distributed about the rotor core 102 and are arranged such that a pair of the first set of cavities 108A is disposed between a pair of the second set of cavities 108B and an outer perimeter 110 of the rotor core 102.

The magnetizable inserts 104 include a material(s) having ferromagnetic properties such as, but not limited to, iron, neodymium, and nickel. Accordingly, the magnetizable inserts do not exhibit magnetic properties during the rotor assembly, and only become magnets after undergoing a magnetizing process performed after the rotor is assembled. In one form, the plurality of magnetizable inserts 104 may be of different sizes. For example, as illustrated, the inserts 104 includes a first set of magnetizable inserts 104A to be disposed within the first set of cavities 108A and a second set of magnetizable inserts 104B to be disposed within the second set of cavities 108B, where the size of the first set of magnetizable inserts 104A is smaller than that of the second set of magnetizable inserts 104B. In one form, the first set of magnetizable inserts 104A form an outer magnetizable insert ring and the second set of magnetizable inserts 104B form an inner ring magnetizable insert ring.

While the rotor cores 102 are provided as having different size cavities 108 for different size magnetizable inserts 104, the rotor cores may be configured in other suitable ways. For example, the rotor core may only include one size of magnetizable inserts and thus, only have one size cavities. In addition, the cavities do not have to be arranged in pairs as described and illustrated in the figures, and can be configured in various suitable ways. In another example, the rotor core is configured to have one or more magnetizable insert rings disposed circumferentially along the rotor core. Accordingly, the present disclosure is applicable to other types of rotor cores having different cavities and/or magnetizable inserts.

In one form, to assist in the assembly process, the rotor cores 102 includes one or more alignment features at an inner diameter 120 to correspond with one or more alignment features provided at an outer diameter 122 of the mandrel 106. For example, referring to FIG. 2B, the rotor core 102C has, as an alignment feature, tabs 124 extending radially inward at the inner diameter 120 of the rotor core 102C, and the mandrel 106 has, as an alignment feature, slots 126 defined longitudinally along the outer diameter 122 of the mandrel 106. The tabs 124 of the rotor core 102 and the slots 126 are configured such that the tabs 124 extend into or mate with the slots 126 and the tabs 124 may travel along the slot 126 during assembly. While specific example of the alignment features for the rotor core 102 and the mandrel 106 are shown, other suitable alignment features may also be used.

Figure 3:
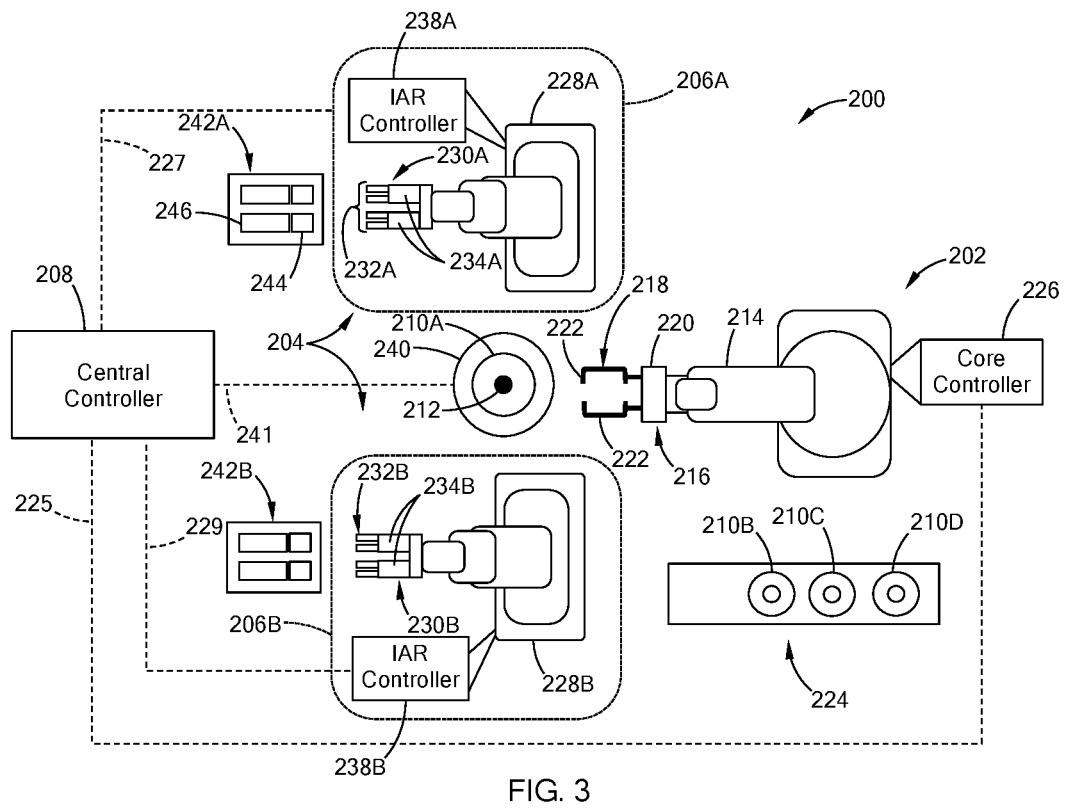
FIG. 3 illustrates a rotor assembly cell in accordance with the present disclosure.

With reference to FIG. 3, in one form, a rotor assembly cell 200 is a manufacturing cell to assemble and stack a plurality of rotor cores with a plurality of magnetizable inserts. The rotor assembly cell 200 includes a core robotic system 202, an insert assembly robotic (IAR) system 204 having a first insert assembly (IA) robot 206A and a second IA robot 206B (collectively "IA robot 206"), and a central controller 208. As described further herein, the core robotic system 202 is configured to assemble rotor cores 210A to 210D (collectively "rotor cores 210") on to a mandrel 212 and the IAR system 204 is configured to place the magnetizable inserts in cavities of the rotor cores 212. In one form, the central controller 208 is configured to control the operation of the core robotic system 202 and the IAR system 204 to coordinate movement therebetween and thus, assembly of the rotor cores 210. In the following, the core robotic system 202 and the IAR system 204 may collectively be referred to as robotic systems 202 and 204. In one form, the rotor cores 210 and the mandrel 212 are provided as the rotor cores 102 and the mandrel 106, respectively, and thus, the rotor cores 210 are assembled with magnetizable inserts that are similar to magnetizable inserts 104.

The core robotic system 202 is a multi-axal industrial robotic arm 214 with an end-of-arm tool 216 having a rotor core end effector 218 with an integrated load cell 220 to provide force feedback. Specifically, the load cell 220 is configured to detect a force and torque having multiple degree of freedom (e.g., 6-degrees freedom) and output the detected force and torque as an electrical signal, which can then be analyzed. The load cell 220 may be strain gauge and/or other suitable force detecting device and is configured to detect along multiple axis.

In one form, the rotor core end effector 218 includes two opposing elongated members 222 having a dual V shaped portion or any number of geometries configured to interface with the outer perimeter of the rotor core 210. Specifically, the end-of-arm tool 216 is configured to pick-up the rotor core 210 from a core staging area 224 and align and assemble the rotor core 210 on the mandrel 212. While a specific rotor core end-effector 218 is illustrated, the rotor core end effector 218 having the integrated load cell 220 may be configured in other suitable ways.

The core robotic system 202 further includes a controller 226 (i.e., a core controller 226) for controlling movement of the robotic arm 214. In one form, the core controller 226 is configured to employ force control based positioning in which the core robotic system 202 automatically adjusts movement of the robotic arm 214 having end-of-arm tool 216 from a programmed path based on force feedback detected by the load cell 220. For example, if the force feedback is greater than a defined value or profile for the particular operation being performed, which may also be provided as a desired parameter, the core controller 226 adjusts the position of the end-of-arm tool 216 until the force feedback coincides with the defined value/profile. Alternatively, if the force feedback does not coincide with the desired parameter, the core controller 226 determines the occurrence of an abnormal installation operation and notifies the central controller 208.

In one form, the IAR system 204 includes two IA robots, where the first IA robot 206A is configured to place a first set of magnetizable inserts into a first set of cavities of the rotor core 210 and the second IA robot 206B is configured to place a second set of magnetizable inserts into a second set of cavities. In one form, the IA robots 206 are multi-axial (e.g., six axis) industrial robotic arms 228A and 228B with end-of-arm tools 230A and 230B having gripper end-effectors 232A and 232B with integrated load cells 234A and 234B to provide force feedback similar to the load cell 220. In the following the industrial robotic arms 228A and 228B are collectively referred to as "industrial robotic arms 228," the end-of-arm tools 230A and 230B are collectively referred to as "end-of-arm tools 230," the gripper end-effectors 232A and 232B are collectively referred to as "gripper end-effectors 232," and load cells 234A and 234B are collectively referred to as "load cells 234." The end-of-arm tools 230 may also be referred to as force control end-effector(s).

In one form, each of the gripper end-effectors 232 is provided as a two-finger grippers configured to retrieve and grip a magnetizable insert. In one form, the end-of-arm tools 230 are further configured to acquire the magnetizable inserts at a first orientation and to align and release the inserts in respective cavities at a second orientation different from that of the first orientation. For example, with reference to FIG. 4A to 4C, the end-of-arm tool 230 is configured to retrieve magnetizable inserts 231A and 231B at a first orientation provided along an X-Y plane (FIG. 4A) and then change orientation to align the inserts 231A and 231B above a core 233 along the Y-Z plane. In addition, in one form, at least one of the finger grippers of the gripper end-effector 232 is pivotable about an insert installation axis (e.g., axis Z) to position the inserts 231A and 231B in the cavities (not shown) that are skewed or slanted from one another (e.g., cavities in FIGS. 2A and 2B). An example of such an end-of-arm tool for the IA robot is disclosed in Applicant's co-pending application titled "INTEGRATED ROBOTIC END EFFECTORS HAVING END OF ARM TOOL GRIPPERS" which is commonly owned with the present application and the contents of which are incorporated herein by reference in its entirety. While the gripper end-effectors 232 are illustrated as having a pair of two-finger grippers, the gripper end-effector 232 may include one or more two-finger grippers to retrieve one or more magnetizable inserts.

The IAR system 204 further includes one or more controllers 238 (i.e., IAR controllers 238A and 238B in FIG. 3) for controlling movement of the robotic arms 228. In one form, similar to the core controller 226, the IAR controllers 238 are configured to employ force control based positioning in which the IA robots 206 automatically adjusts from a programmed path based on force feedback detected by the load cells 234. For example, if the force feedback is greater than a defined value or profile (i.e., desired parameter) for the particular operation being performed such as, aligning and positioning magnetizable inserts with respective cavities, the IAR controllers 238 adjust the position of the end-of-arm tools 230 until the force feedback resistance coincides with the defined valued/profile. Alternatively, similar to the core controller 226, if the force feedback does not coincide with the desired parameter, the IAR controllers 238 determines the occurrence of an abnormal installation operation and notifies the central controller 208.

While the IAR system 204 includes two IA robots 206, the IAR system 204 may include one or more IA robots 206 based on, for example, the configuration of the rotor cores, the manufacturing parameters (e.g., cycle time, part assembly quota, etc.), among other considerations. In addition, an IA robot may be configured to install different size magnetizable inserts, and thus, the IAR system 204 is not required to have different IA robot for different sized magnetizable inserts.

By employing force control feedback, the robotic systems 202 and 204 are able to learn and adapt to the assembly process allowing flexibility. Accordingly, the core robotic system 202 is able to adapt to the assembly process allowing flexibility with respect to, for example, placement and positioning of rotor cores 210 irrespective of the size of the rotor core. In addition, the IAR system 204 can adapt to manufacturing tolerances associated with the cavities of the rotor cores 210.

In one form, the central controller 208 is configured to synchronously control the robotic systems 202 and 204 to assemble the rotor cores 210 and is communicably coupled to the robotic systems 202 and 204 and more specifically, the core controller 226 and the IARs controller 238, as illustrated by dash lines 225, 227 and 229 in FIG. 3. The central controller 208 may include a controller and/or a programmed logical controller (PLC) to execute computer readable instructions for performing the operations described herein and a user interface (not shown), such as a touchscreen display, a speaker, a microphone, among others. In particular, in one form, the central controller 208 is configured to centrally control the motion of the robotic system 202 and 204 to improve overall assembly process efficiency and achieve manufacturing metrics such as cycle time and jobs per hour.

In one form, the central controller 208 is configured to monitor operations of the robotic systems 202 and 204, and/or coordinate movement of the robotic systems 202 and 204, among other functions such as issue a notification if an abnormal operation has occurred. More particularly, the robotic systems 202 and 204 may transmit data to the central controller 208 regarding whether a rotor core is positioned on the mandrel, whether the IAR system 204 has placed magnetizable inserts into cavities, and/or an occurrence of an abnormal operation, among other information regarding the processes performed by respective robotic systems 202 and 204. Based on these determinations, the central controller 208 is configured to instruct the robotic systems 202 and 204 on performing subsequent steps such as having the IAR system 204 place next set of magnetizable inserts, have the core robotic system 202 position the next rotor core onto the mandrel, have the core robotic system 202 transfer the assembled rotor cores, and/or stop the rotor assembly and issue a notification to the user regarding the abnormal operation.

Furthermore, in one form, the central controller 208 is configured to obtain data regarding the force control feedback performed by the robotic systems 202 and 204 and analyze the data to determine trends associated with the rotor assembly process. For example, the central controller 208 is configured to associate the force feedback with abnormal operations to track number of occurrences which can then be used to detect quality issues in the rotor cores and/or the magnetizable inserts. In another example, the central controller 208 is further configured to include machine learning logic to improve automation of the tasks by recognizing patterns in force feedback and positional adjustments made to perform an installation.

In one form, the central controller 208, the core controller 226, and the IARs controller 238 form a control system for controlling the operations the described herein. In one variation, the central controller 208 may be omitted and thus, the control system includes the core controller 226 and the IARs controller 238 for performing the operations described herein. For example, the core controller 226 and the IARs controllers 238 are communicably coupled to one another via wired and/or wireless communication links to coordinate operations and transmit notifications. In addition, the core controller 226 and/or the IARs controllers 238 are configured to detect abnormal operations of the robotic system 202 and 204, determine trends associated with the rotor assembly process, and/or employ learning logic to improve automation of the tasks, as described above with the central controller 208.

In one form, the rotor assembly cell 200 also include a worktable 240 and magnetizable insert cartridge feeders 242A and 242B (collectively "insert cartridge feeders 242"). The worktable 240 supports the rotor core(s) 210 and the mandrel 212 and, in one form, is rotatable. More particularly, in one form, the worktable 240 is operable by the central controller 208, as represented by dashed line 241 in FIG. 3, to automatically rotate an incremental amount to align the IAR system 204 with cavities of the rotor core 210. If the central controller 208 is not employed, the worktable 240 may be operable by the core controller 226 and/or the IARs controllers 238. It should be readily understood that rotatable worktable 240 is not required for aligning the cavities with the IAR system 204. For example, the IAR system 204 may employ multiple IA robots 206 that are configured to sequential place the inserts in the cavities.

The insert cartridge feeders 242 are configured to hold and dispense the magnetizable inserts to be assembled in the rotor core, and one or more cartridge feeders 242 may be provided for each of the IA robots 206. In the example application, the insert cartridge feeders 242A for the first IA robot 206A holds the first set of magnetizable inserts and the insert cartridge feeders 242B for the second IAR hold the second set of magnetizable inserts. In an example application, an insert cartridge feeder 242 includes a cartridge 244 holding multiple magnetizable inserts from the plurality of magnetizable inserts and a pneumatic slide 246 to dispense a single magnetizable insert at a time from the cartridge 244. In the example application, the cartridge 244 is arranged as a vertical tower. While four cartridge feeders 242 are illustrated, one or more cartridge feeders 242 may be employed based on the number of IA robots, the type of magnetizable inserts, among other considerations. In addition, while specific cartridge feeders are illustrated other suitable dispensers may be used for automatically dispensing the magnetizable inserts.

Referring to FIG. 5, an example assembly routine 400 performed with the rotor assembly cell 200 is provided. At 402, the core robotic system 202 places a first rotor 210A on the worktable with the mandrel 212. That is, in one form, the first rotor core 210 from among the plurality of rotor cores is preassembled with the mandrel 212 and provided at the pallet area 224 with the other rotor cores 210B, 210C, 210D. As such, at 402, the core robotic system 202 picks up and transfers the first rotor core with the mandrel to the worktable 240 and in one form, transmits a signal indicating completion of placement to the central controller 208 to trigger placement of magnetizable inserts.

At 404, the IAR system 204 places a plurality of magnetizable inserts into a plurality of cavities in the rotor core (i.e., the first rotor core). Specifically, the first IA robot 206A obtains and grips one or more magnetizable inserts from the first set of magnetizable inserts provided at the insert cartridge feeders 242A. The first IA robot 206A then aligns and positions the magnetizable inserts from the first set of magnetizable inserts into one or more cavities from the first set of cavities based on a force feedback detected by the load cell of the first IA robot 206. In one form, the one or more cavities from the first set of cavities are directly adjacent to one another. In another form, one or more cavities are separated from another by at least one other cavity.

In one form, in aligning the magnetizable inserts, the first IA robot 206A is configured to position and align a first magnetizable insert into a first cavity, and once aligned, position and align the other magnetizable insert(s) based on a set offset. Accordingly, the magnetizable inserts are staggeredly placed in the cavities. In one form, in positioning the magnetizable inserts, the first IA robot 206A is configured to release the one or more of magnetizable inserts from the first set of magnetizable inserts into the one or more of cavities, such that the one or more of magnetizable inserts from the first set of magnetizable inserts independently descend into the one or more of cavities. That is, the magnetizable inserts fall into respective cavities via gravity. In another application, the first IA robot 206A may apply some force to the one or more of magnetizable inserts to position them within the cavity.

The second IA robot 206B obtains and grips one or more magnetizable inserts from the second set of magnetizable inserts provided at the insert cartridge feeders 242B, and performs in a similar manner as that of the first IA robot 206A to align and position of the magnetizable inserts with one or more cavities from the second set of cavities. Thus, details regarding such operation is omitted for brevity.

At 404, the central controller 208 coordinates movement of the IA robots 206A and 206B such that the magnetizable inserts from the first set of magnetizable inserts and the second set of magnetizable inserts are positioned at about the same time. Once the magnetizable inserts are placed, the IAR system 204 notifies the central controller 208 and the central controller 208 automatically rotates the mandrel 212 having the rotor core 210A to align empty cavities of the rotor core 210A with the IAR system 204 to place the next set of magnetizable inserts into respective cavities. For example, the central controller 208 rotates the worktable 240 supporting the mandrel 212 and the rotor core(s) 210 to align the empty cavities. In one form, at 404, the central controller 208 is configured to track the placement of the magnetizable inserts based on, for example, the number of rotations, the number of completion notifications from the IAR system 204, and/or the number of magnetizable inserts retrieved from the insert cartridge feeders 242, among other methods.

At 406, after the plurality of magnetizable inserts are assembled in the plurality of cavities, the central controller 208 determines if additional rotor cores 210 are to be assembled. For example, the central controller 208 may maintain a counter for determining the number of rotor cores 210 assembled. If all the rotor cores 210 are assembled, the central controller 208 instructs the core robotic system 202 to transfer the stacked rotor cores. Specifically, the core robotic system 202, at 408, transfers the rotor cores 210 with the mandrel 212 from the worktable 240 to a second area such as a mold-press operation.

If additional rotor cores 210 are to be assembled, the core robotic system 202, at 408, acquires the next rotor core 210 from the pallet 224 and assembles it onto the mandrel 212. In one form, with the rotor core 210 and mandrel 212 having alignment features as described above, the core robotic system 202, using force feedback detected by the load cell, aligns the tabs of the rotor core 210 with the slots of the mandrel 212 and then translationally moves the rotor core 210 along the mandrel 212 until the rotor core 210 abuts against the preceding rotor core 210. Once the new rotor core 210 is positioned the routine proceeds to placing the magnetizable inserts, at 404.

It should be readily understood that the routine 400 is for exemplary purposes and that other routines may be provided. For example, in lieu of a first rotor core preassembled with the mandrel, the routine may place a mandrel stand onto the worktable and then place the first rotor core onto the mandrel. In another example, a vision system may be provided within the rotor assembly system to monitor macro motions such as movement of rotor cores, retrieval of magnetizable inserts, transfer of rotor core, among other processes.

Furthermore, the routine 400 may also vary based on the configuration of the rotor assembly cell and more particularly, the number of insert assembly robots of the IAR system. In one form, the rotor assembly cell may sequentially place N magnetizable inserts at a time into N cavities among the plurality of cavities, wherein N is a number that is less than a total number of magnetizable inserts to be placed. For example, in the application provided herein, N is 4 since there are two insert assembly robots. In another example, additional insert assembly robots may be provided such that all the magnetizable inserts are placed into the cavities at once and/or without rotating the mandrel having the rotor cores.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

What is claimed is:

1. A method for assembling a plurality of rotor cores of an electric converter by a central robotic system, the method comprising:
   providing the central robotic system that includes a core controller, an insert assembly robotic (IAR) system that includes an IAR controller, and a central controller;
   placing a rotor core of the plurality of rotor cores on a mandrel by the central robotic system, wherein the rotor core further comprises a plurality of cavities;
   employing a first force control feedback from the core controller of the central robotic system to the central controller and the IAR controller;
   placing a plurality of magnetizable inserts into the plurality of cavities in the rotor core by the IAR system; and
   adjusting a movement of a robotic arm of the central robotic system based on the first force control feedback so that a detected force coincides with a defined value or profile.

2. The method of claim 1, wherein the plurality of magnetizable inserts includes a first set of magnetizable inserts and a second set of magnetizable inserts, wherein the first set of magnetizable inserts is of a different size than that of the second set of magnetizable inserts.

3. The method of claim 1, wherein placing the rotor core on the mandrel further comprises:
   aligning an alignment feature at an inner diameter of the rotor core with an alignment feature at an outer diameter of the mandrel based on the first force control feedback detected by the core controller of the central robotic system; and
   translationally moving the rotor core along the mandrel based on the first force control feedback detected by the core robotic system.

4. The method of claim 1 further comprising:
   transferring the plurality of rotor cores with the mandrel in response to completion of an assembly; and
   placing a second mandrel for subsequent assembly of a second plurality of rotor cores by the core robotic system.

5. The method of claim 1 further comprising:
   monitoring the first force control feedback from the core controller of the central robotic system to the central controller; and
   determining an abnormal installation operation in response to the monitored first force control feedback exceeding a desired parameter.

6. The method of claim 1, wherein the employing the first force control feedback from the core controller of the central robotic system to the central controller and the IAR controller further comprises:
   detecting a force or torque, by the core robotic system; and
   outputting the detected force or torque as an electrical signal.

7. The method of claim 6 further comprising:

analyzing the electrical signal to determine whether the detected force or torque aligns with a defined value or profile; and adjusting the movement of the robotic arm of the core robotic system until the detected force or torque values coincides with the defined value or profile by a controller of the core robotic system.

8. The method of claim 6 further comprising:

detecting a force or torque by a second force control feedback of the IAR system;

outputting the detected force or torque as an electrical signal;

analyzing the electrical signal to determine whether the detected force or torque aligns with a defined value or profile; and adjusting the movement of the insert assembly robot of the IAR system until the detected force or torque values coincides with the defined value or profile by a controller of the IAR system.

9. A method for assembling a plurality of rotor cores of an electric converter by a central robotic system, the method comprising:

providing the central robotic system that includes a core controller, an insert assembly robotic (IAR) system that includes an IAR controller, and a central controller;

placing a rotor core of the plurality of rotor cores on a mandrel by the central robotic system, wherein the rotor core further comprises a plurality of cavities;

employing a first force control feedback from the core controller of the central robotic system to the central controller and the IAR controller;

placing a plurality of magnetizable inserts into the plurality of cavities in the rotor core by the IAR system by gripping, at a first orientation, one or more magnetizable inserts from the plurality of magnetizable inserts by a robotic arm of the IAR system; and aligning and positioning, at a second orientation different from the first orientation, the one or more magnetizable inserts at one or more cavities among the plurality of cavities based on a second force control feedback detected by the IAR controller of the IAR system; and adjusting a movement of the robotic arm of the central robotic system based on the first force control feedback so that a detected force coincides with a defined value or profile.

10. The method of claim 9, wherein the placing the plurality of magnetizable inserts into the plurality of cavities in the rotor core further comprises releasing the gripping of, by the IAR system, the one or more magnetizable inserts into the one or more cavities, wherein the one or more magnetizable inserts independently descend into the one or more cavities.

11. A method for assembling a plurality of rotor cores of an electric converter by a central robotic system, the method comprising:

providing the central robotic system that includes a core controller, an insert assembly robotic (IAR) system that includes an IAR controller, and a central controller;

placing a rotor core of the plurality of rotor cores on a mandrel by the central robotic system, wherein the rotor core further comprises a plurality of cavities;

employing a first force control feedback from the core controller of the central robotic system to the central controller and the IAR controller;

placing a plurality of magnetizable inserts into the plurality of cavities in the rotor core by the IAR system employing a second force control feedback; and adjusting a movement of a robotic arm of the central robotic system, an insert assembly robot of the IAR system, or a combination thereof based on the first force control feedback, the second force control feedback, or a combination thereof so that a detected force coincides with a defined value or profile.

12. The method of claim 11, wherein the placing the plurality of magnetizable inserts into the plurality of cavities of the rotor core further comprises:

gripping, at a first orientation, one or more magnetizable inserts from the plurality of magnetizable inserts by the robotic arm of the IAR system; and aligning and positioning, at a second orientation different from the first orientation, the one or more magnetizable inserts at one or more cavities among the plurality of cavities based on the second force control feedback detected by the IAR system.

13. The method of claim 12, wherein the placing the plurality of magnetizable inserts into the plurality of cavities in the rotor core further comprises releasing the gripping of, by the IAR system, the one or more magnetizable inserts into the one or more cavities, wherein the one or more magnetizable inserts independently descend into the one or more cavities.

14. The method of claim 11, wherein the plurality of magnetizable inserts includes a first set of magnetizable inserts and a second set of magnetizable inserts, wherein the first set of magnetizable inserts is of a different size than that of the second set of magnetizable inserts.

15. The method of claim 11, wherein placing the rotor core on the mandrel further comprises:

aligning an alignment feature at an inner diameter of the rotor core with an alignment feature at an outer diameter of the mandrel based on the first force control feedback detected by the core controller of the central robotic system; and translationally moving the rotor core along the mandrel based on the first force control feedback detected by the core robotic system.

* * * * *